INVENTORS
HAROLD F. ADAMS
WILLIAM E. CONNOLLY
By [signature]
Agent

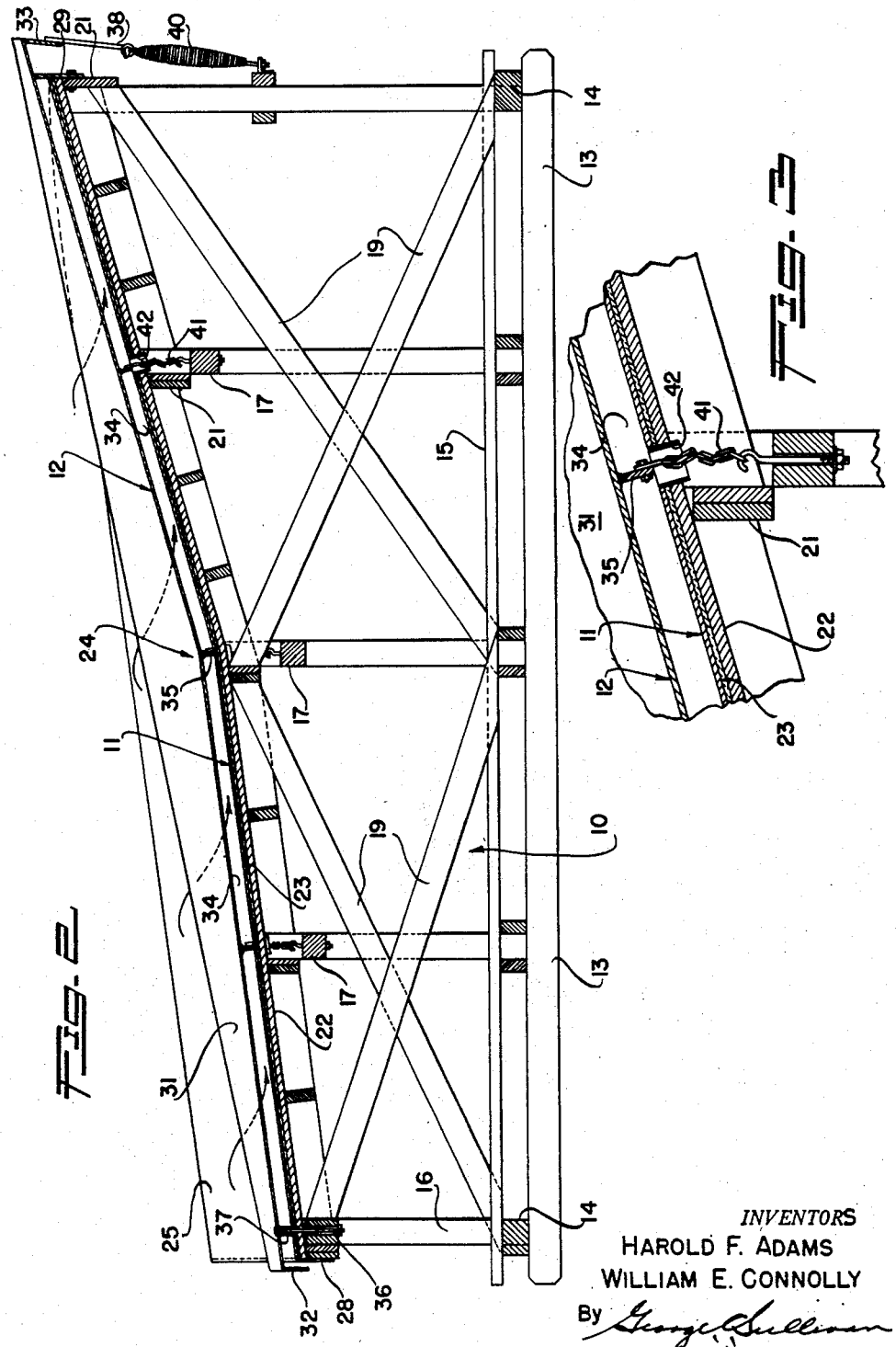

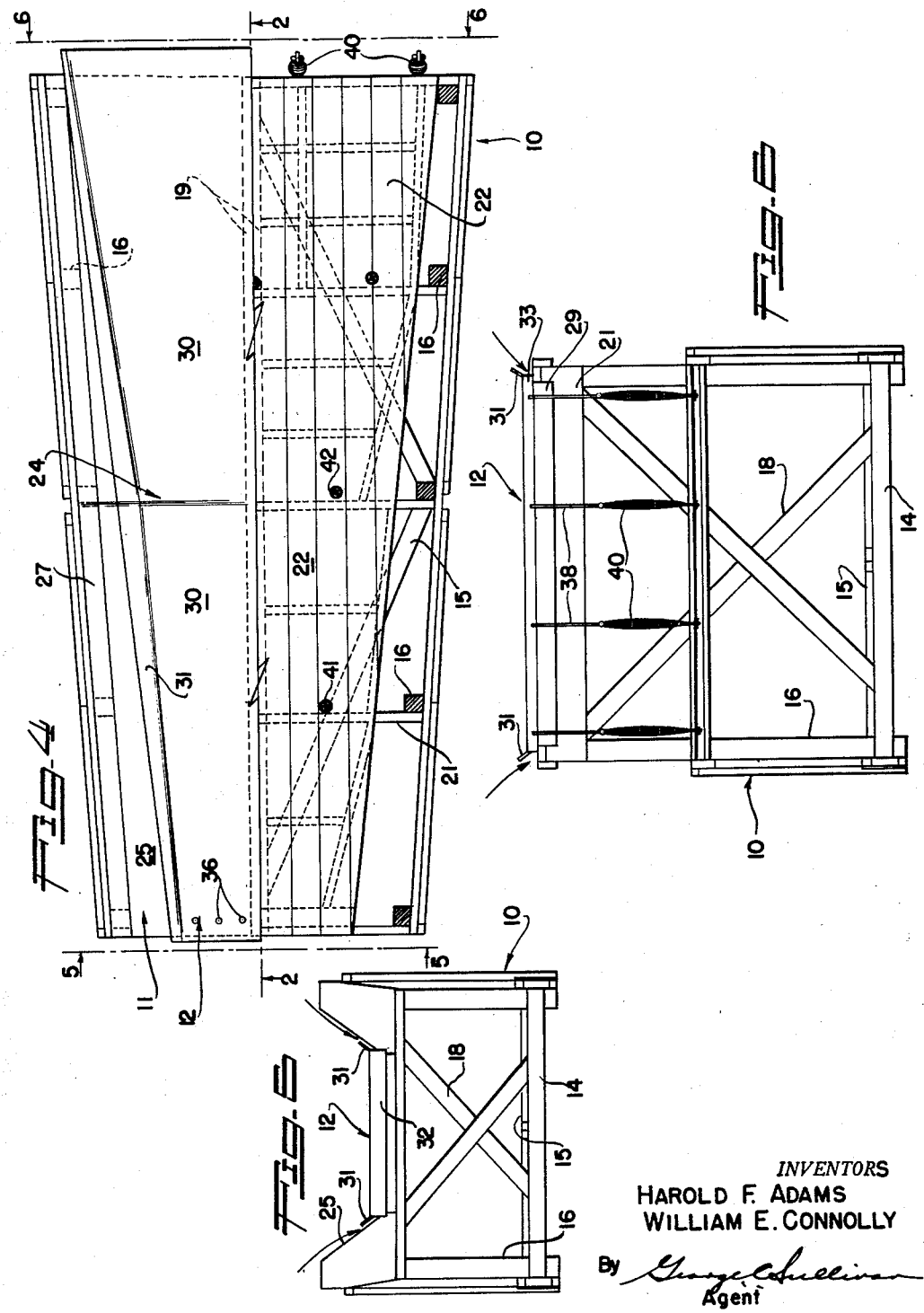

Patented July 6, 1954

2,683,002

UNITED STATES PATENT OFFICE 2,683,002

BLAST CHUTE

Harold F. Adams, Alhambra, and William E. Connolly, Sunland, Calif., assignors to Lockheed Aircraft Corporation, Burbank, Calif.

Application June 28, 1952, Serial No. 296,228

13 Claims. (Cl. 244—1)

This invention relates to devices for use with jet propelled aircraft, and the like, and relates more particularly to devices for use at airports, aircraft factories, aircraft carriers, and other places where such aircraft are warmed-up, tested, serviced, etc.

The reactive propulsive aircraft powerplants such as jet engines and ram jets, produce high temperature, high velocity jets of air and gases of combustion. In warming up and testing the engines these jet blasts are very hazardous and destructive even at a considerable distance from the airplane or engine, and personnel that may inadvertently enter such a blast may be killed or seriously injured. Accordingly, unusual precautions must be taken when servicing and testing the jet engines to prevent injury to the personnel and damage to adjacent equipment and installations. The blast fences employed where propeller driven airplanes are warmed up are completely inadequate and ineffective for the purpose. The jet blasts of jet engines also create a tremendous roar or sound that cannot be tolerated by the workmen or personnel for any prolonged period without ear protectors, or the like, and even with such protective measures the jet noises produce undesirable physiological reactions.

It is a general object of the present invention to provide a simple, practical, and effective chute or deflector for controlling and deflecting the jet streams or blasts issuing from jet engines being warmed up, serviced, tested, etc.

Another object of the invention is to provide a blast deflector of this kind that diverts the high temperature and high velocity jet upwardly from adjacent the nozzle of the engine to avoid the possibility of personnel moving into the jet blast and to conserve space at the field. The deflector is constructed so that it may be arranged immediately at the rear of the jet nozzle and serves to divert the jet blast upwardly and rearwardly at a substantial angle so that it is possible to walk behind the device without danger and so that the warming up and testing operations may be carried out in a relatively limited space. The device not only avoids injury to the workmen but prevents damage to nearby equipment and installations. These considerations well adapt the device for use on aircraft carriers and in other places where the space available for the warming up and testing operations is limited.

Another object of the invention is to provide a jet blast chute or deflector that operates to greatly reduce the undesirable effects of the noise produced by the jet stream. The device of our invention includes a trough or channel-like chute structure designed to divert the jet stream upwardly and rearwardly in such a way that the lateral or horizontal propagation of the jet noise is reduced, thus greatly reducing the audible sound level at the field. The upward deflection of the blast not only minimizes the noise or sound level in the immediate vicinity but also lessens the noise at more remote points, the sound apparently dissipating to a large extent in the air at a considerable elevation above the ground level. Thus the device removes or reduces to a minimum the noise which has been a source of considerable annoyance to those living and working in the general vicinity of the airport or field.

Another object of the invention is to provide a blast chute that is long wearing and resistant to the high temperatures of the jet streams. The chute includes a liner constructed and arranged to withstand the high temperatures for prolonged periods and that may be easily replaced when worn or burned through.

Another object of the invention is to provide a jet blast deflector in which the liner is mounted or supported in such a manner that it is free to expand and contract relative to the other parts of the device and is capable of "floating" freely in response to the action of the strong high temperature jet blast.

A further object of the invention is to provide a blast deflector in which the lower or underside of the free floating liner and the upper portion of the device are insulated and protected by a layer of air. The device is constructed so that air is induced to flow under the liner or between the liner and the fixed upper surface of the chute structure, thus thermally insulating and protecting the structure as well as cooling the liner itself. In addition, a layer of thermal insulating material is provided between the supporting frame and the cover plate to protect the frame.

A still further object of the invention is to provide a blast deflecting chute of the kind mentioned that will not move or "creep" when in use and that does not require anchor means, or the like, to hold it in place. The trough and liner mentioned above are constructed to have a compound angle and are so designed that the powerful high velocity blast of the jet engine does not shift or move the device. The configuration of the liner is related to the jet blast in such a way that the device has no tendency to move or creep as a result of the impingement of the blast. This avoids the necessity of providing anchoring installations for the device.

Other objectives and features will become apparent from the following detailed description of a typical preferred embodiment wherein:

Figure 2 is an enlarged longitudinal detailed sectional view of the deflector taken as indicated by line 2—2 on Figure 4, the arrows indicating the manner in which air flows under the liner;

Figure 3 is an enlarged fragmentary vertical sectional view illustrating one of the means for loosely securing or anchoring the liner;

Figure 4 is a somewhat reduced plan view of the device with a portion appearing in horizontal cross section and with a part of the liner broken away to show the underlying parts in plan elevation;

Figure 5 is a front view of the device taken substantially as indicated by line 5—5 on Figure 4; and Figure 6 is a rear elevation of the device taken substantially as indicated by line 6—6 on Figure 4.

Figure 1:
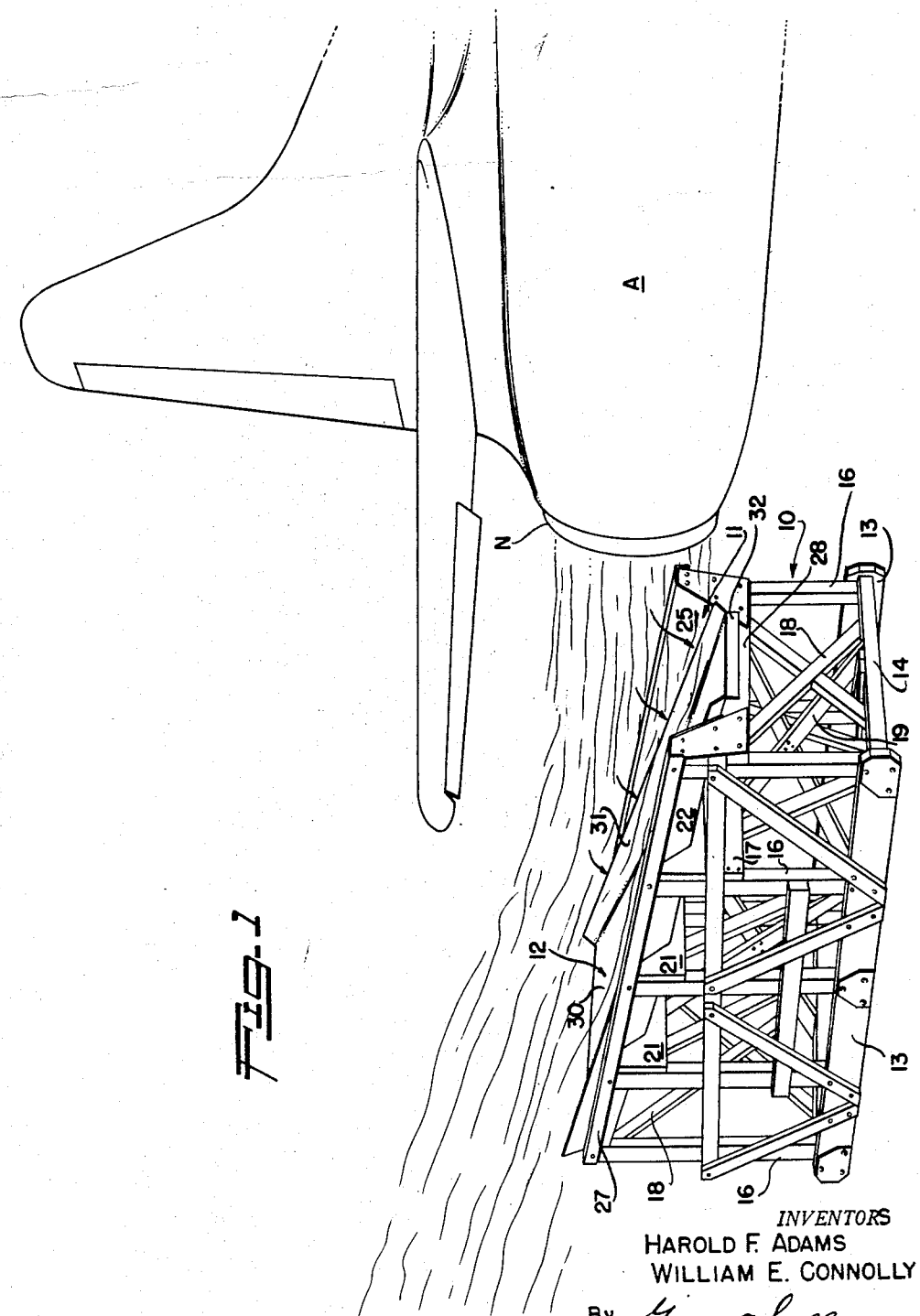
Figure 1 is a perspective view of the device of the invention arranged at the rear of a jet propelled airplane illustrating the manner in which the jet blast is deflected and in which air is induced to flow under the liner of the device.

The chute or deflector of the invention may be constructed for specific installations and for use with given engines and aircraft. In the drawings we have illustrated a typical form of the invention employed with a more or less conventional jet propelled airplane, it being understood that this is merely one typical exemplary application of the invention.

The jet deflector of our invention may be said to comprise, generally, a body or frame 10, an insulated cover plate 11 on the upper side of the frame 10, and a loosely constrained liner 12 above the plate 11.

The frame 10 may, of course, be constructed of any suitable or appropriate material or materials. In the particular case illustrated, the frame 10 is constructed primarily of wood and is in the nature of a sturdy elongate upright framework. It is preferred to employ wood in the construction of the frame 10 because of its sound dampening and absorbing characteristics. The frame includes two longitudinally extending skids 13 which may rest directly on the ground or other support. The skids 13 are connected by transverse members 14 and diagonal braces 15 are secured to the members 14. Spaced posts 16 rise from the skids 13 and horizontal beams 17 extend between the upper portions of the posts. Diagonal braces 18 connect the upper ends of the posts and the transverse members 14 and additional bracing 19 extends between the upper and lower parts of the frame 10. Contour boards 21 are bolted in the upper portion of the frame 10 and are shaped so that their upper edges conform to and support the trough-like cover plate 11 and the planking 22 for the same. The frame 10 may, of course, include other elements and parts as the conditions of use may dictate.

The channel plate or cover plate 11 is constructed of steel, or the like, and constitutes the primary channel or chute element of the device. The plate 11 may be rigidly secured to the planking 22 and other parts of the frame 10 and preferably extends the full length of the frame. Sheet asbestos 23, or other thermal insulating material is preferably arranged between the sheathing or planking 22 and the underside of the cover plate 11. The main medial region of the plate 11 is flat and slopes upwardly and rearwardly from the forward end of the frame 10 to its aft end. It is a feature of the invention that the forward half or portion of this bottom or medial region of the plate 11 slopes upwardly and rearwardly at a relative small angle while the rear half or portion slopes upwardly and rearwardly at a substantially greater angle, the change in angle occurring at the transverse line or plane 24. As will be more fully described, this change in angle of the trough bottom is important in maintaining stability of the device. The cover plate 11 has side parts 25 which flare or slope upwardly and laterally from the opposite longitudinal edges of its medial portion. These side parts 25 are continuous from one end of the frame 10 to the other and have marginal flanges 27 which engage over and are secured to the upper longitudinal edges of the frame structure 10.

The cover plate 11, just described, is an elongate channel or trough-like structure having laterally flaring sides 25 and, as will be seen from an inspection of Figure 4, this channel flares in the longitudinal direction, being considerably wider at the rear end than it is at the forward end. This longitudinal increase in width or flaring of the channel accommodates the rearward expansion of the jet stream as it travels through or across the deflector. Furthermore, as will be seen from Figures 1 and 2, the flaring sides 25 of the plate 11 are of greater height at the forward end than at the aft end, gradually becoming of less height toward the rear end of the device. This assures full direction and control of the blast stream as it enters the chute and yet allows for the expansion of the stream as it travels rearwardly. In addition to the main cover plate 11, suitable protective end cover plates 28 and 29 are secured to the front and rear contour boards 21 or to the ends of the frame structure 10.

The liner 12, mentioned above, its relationship to the other parts of the device, and the manner in which it is secured or retained in place, are features of the invention. The liner 12 is preferably constructed of steel, or other material resistant to high temperatures, and is a channel or trough-like element conforming, generally, to the cover plate 11. As best illustrated in Figures 4 and 5, the liner 12 has a main bottom or medial portion 30 which overlies the medial region of the cover plate 11 and this portion 30 slopes upwardly and rearwardly from the forward end of the chute at a relatively slight angle and then at the plane 24 slopes upwardly and rearwardly at a greater angle, the portion 30 of the liner being substantially parallel with the corresponding medial portion of the cover plate 11. Side walls 31 are provided on the liner 12 and flare laterally and upwardly from the longitudinal margins of its medial portion 30. At the forward end of the device the side walls 31 are considerably shorter or lower than the side walls 25 of the cover plate 11 but as the upper edges of the walls 31 are straight, while the upper edges of the walls 25 curve toward the rear end of the chute, the side walls 31 are higher than the walls 25 at the aft end of the chute. The forward end of the liner 12 has a depending flange or apron 32 and a similar apron 33 is provided on the rear end of the liner.

In accordance with the invention the liner 12 is spaced from the cover plate 11 in a manner to leave cooling air spaces 34. The means for spacing the liner 12 above the plate 11 may comprise spaced transverse cleats 35 welded or otherwise fixed to the medial portion 30 of the liner 12 at longitudinally spaced planes. The liner 12 is supported on these cleats 35 which rest on the plate 11 and the aft end of the liner may rest on the upper edge of the above mentioned rear plate 29. It is to be observed that the air spaces 34, thus provided, are open to the atmosphere at the side walls 31, the walls 31 being spaced from the trough walls 25 so that air may flow into the spaces as indicated by the arrows in Figures 1, 2 and 5. The high velocity jet flowing through or across the trough or chute induces atmospheric air into the spaces 34 thus providing an insulating layer of relatively cool air under the liner 12.

The liner 12 is fixidly or rigidly secured to the frame 10 adjacent its forward end. A plurality of bolts 36 serves to secure the forward end portion of the liner 12 to the frame 10 and tubular spacers 37 are provided on the bolts to hold the liner spaced above the plate 11. Spring means is provided to yieldingly restrain or anchor the rear end of the liner 12 to the frame 10. This means includes transversely spaced vertically disposed rods 38 secured to the apron 33 and projecting downwardly therefrom and extensible coiled springs 40 are connected between the rods and the frame 10. These springs 40 offer considerable resistance to upward movement of the liner 12 but are extensible to permit upward movement of the liner when the heavy blast or jet tends to lift or flutter the liner. The springs 40 of course flex or extend to allow thermal expansion and contraction of the liner relative to the frame 10. The means for loosely restraining the liner 12 further includes a plurality of chains 41, or equivalent flexible elements, secured to each cleat 35 and passing downwardly through tubes 42 arranged in the plate 11 and planking 22. The lower ends of the chains 41 are anchored to the frame 10, for example to the beams 17. The forward chains 41 are somewhat shorter than those connected with the aft portion of the liner, the chains being progressively longer toward the aft end of the device. It is to be understood that all of the chains 41 have slack or play when the liner 12 is in the idle position illustrated throughout the drawings so as to allow limited freedom of movement of the liner. The above described arrangement of the springs 40 and chains 41 allows free thermal expansion and contraction of the liner relative to the plate 11, the liner being fixedly secured or anchored at one end only by the bolts 36. Further, the loose chains 41 and springs 40 allow the liner and portions of regions thereof to bend and flex under the impact of the high velocity high temperature jet blast. In practice, the liner 12 often flexes at regions between the cleats 35 and the chains 41 are related and arranged to allow free relative longitudinal flexure as well as up and down play of the liner.

It is believed that the operation of the jet deflector or blast chute of this invention will be readily understood from the foregoing detailed description. In Figure 1 we have illustrated the manner in which the jet issuing from the nozzle N of an airplane A is deflected or directed upwardly by the blast chute. The hot high velocity stream of air and gasses is directed upwardly and rearwardly by the liner 12 and, to some extent, by the side walls 25 of the plate 11. This upward deflection of the jet blast avoids the possibility of personnel being injured by it and protects adjacent equipment and installations against damage. The arrows throughout the drawings illustrate the manner in which the air is drawn into the cooling air spaces 34 by the inductive action of the jet or high velocity stream. This air flowing under the liner 12 assists in preventing overheating of the liner and maintains the plate 11 in a relatively cool condition. The cooling air spaces together with the insulating layer 23 prevent overheating of the frame 10. The change in angle of the liner 12 and plate 11 at the plane 24 has been found to be important. It appears that the particular configuration and angular relationship of the front and rear portions of the chute result in or produce a component of force as a result of the upward direction of the jet stream which resists movement or creeping of the structure. As a consequence it has been found unnecessary to provide means for anchoring the device when in use. As above described, the liner 12 is loosely restrained by the springs 40 and chains 41 in such a way that it is free to move and flex to a limited extent as a result of the impingement of the hot high velocity jet against it. The portions of the liner 12 between the cleats 35 may flex and bend individually and the entire liner is free to expand and contract in the longitudinal direction and relative to the plate 11 and frame 10. Accordingly, the high temperatures to which the device is subjected do not cause permanent distortion or warping of the liner 12 or other parts. It has been found that the upward deflection of the jet blast materially reduces the sound level in the immediate vicinity as well as at points more remote from the airplane.

Having described only a typical form of the invention we do not wish to be limited to the specific details herein set forth, but wish to reserve to ourselves any variations or modifications that may appear to those skilled in the art and fall within the scope of the following claims.

We claim:

1. A blast chute for deflecting the high velocity high temperature jet issuing from the nozzle of an aircraft jet engine comprising a supporting structure adapted to be positioned behind the nozzle, an upwardly facing channel plate on top of said structure having an open forward end to receive the jet from the nozzle and extending upwardly and rearwardly from its forward end toward the rear end of said structure to direct the jet upwardly, the channel plate comprising a bottom wall and side walls extending upwardly from the margins thereof, a liner for the channel plate spaced above the bottom wall thereof to leave a cooling air space that is open at said side walls for the reception of air, means for rigidly anchoring the liner adjacent its forward end, and spaced restraining means restraining the remainder of the liner for limited movement relative to the channel plate.

2. A blast chute for deflecting the high velocity high temperature jet issuing from the nozzle of an aircraft jet engine comprising a frame adapted to be positioned behind the nozzle, an upwardly facing channel plate on top of the frame having an open forward end to receive the jet from the nozzle and extending upwardly and rearwardly from its forward end toward the rear end of the frame to direct the jet upwardly, the channel plate comprising a bottom wall and side walls extending upwardly from the margins thereof, a liner for the channel plate spaced above the bottom wall thereof to leave a cooling air space, said space being open at said side walls for the reception of air, and means loosely restraining the liner for limited movement relative to the channel plate.

3. A blast chute for deflecting the high velocity high temperature jet issuing from the nozzle of an aircraft jet engine comprising a frame adapted to be positioned behind the nozzle, an upwardly facing channel plate on top of the frame having an open forward end to receive the jet from the nozzle and extending upwardly and rearwardly from its forward end toward the rear end of the frame to direct the jet upwardly, the channel plate comprising a bottom wall and side walls extending upwardly from the margins thereof, a heat resistant liner overlying said bottom wall in spaced relation thereto to leave a cooling air space, means for rigidly anchoring one end of the liner, and means for loosely restraining the remainder of the liner for free limited movement relative to the plate and frame.

4. A blast chute for deflecting the high velocity high temperature jet issuing from the nozzle of an aircraft jet engine comprising a frame adapted to be positioned behind the nozzle, an upwardly facing channel plate on top of the frame having an open forward end to receive the jet from the nozzle and extending upwardly and rearwardly from its forward end toward the rear end of the frame to direct the jet upwardly, the channel plate comprising a bottom wall and side walls extending upwardly from the margins thereof, a heat resistant liner overlying said bottom wall in spaced relation thereto to leave a cooling air space, means fixedly securing the forward end of the liner, and means restraining the remainder of the liner for limited movement relative to the plate.

5. A blast chute for deflecting the high velocity high temperature jet issuing from the nozzle of an aircraft jet engine comprising a frame adapted to be positioned behind the nozzle, an upwardly facing channel plate on top of the frame having an open forward end to receive the jet from the nozzle and extending upwardly and rearwardly from its forward end toward the rear end of the frame to direct the jet upwardly, the channel plate comprising a bottom wall and side walls extending upwardly from the margins thereof, a heat resistant liner overlying said bottom wall in spaced relation thereto to leave a cooling air space, means fixedly securing the forward end of the liner, and means restraining the remainder of the liner for limited movement relative to the plate including slack flexible elements connected between the liner and frame.

6. A blast chute for deflecting the high velocity high temperature jet issuing from the nozzle of an aircraft jet engine comprising a frame adapted to be positioned behind the nozzle, an upwardly facing channel plate on top of the frame having an open forward end to receive the jet from the nozzle and extending upwardly and rearwardly from its forward end toward the rear end of the frame to direct the jet upwardly, the channel plate comprising a bottom wall and side walls extending upwardly from the margins thereof, a heat resistant liner overlying said bottom wall in spaced relation thereto to leave a cooling air space, means fixedly securing the forward end of the liner, and means restraining the remainder of the liner for limited movement relative to the plate including slack flexible elements connected between the frame and the liner at points intermediate the ends of the liner, and tension spring means anchoring the rear end of the liner to the frame.

7. A blast chute for deflecting the high velocity high temperature jet issuing from the nozzle of an aircraft jet engine comprising a frame adapted to be positioned behind the nozzle, an upwardly facing channel plate on top of the frame having an open forward end to receive the jet from the nozzle and extending upwardly and rearwardly from its forward end at a relatively small angle to approximately midway between the ends of the frame and then sloping upwardly and rearwardly to the rear end of the frame at a steeper angle, and a heat resistant liner overlying the plate in spaced relation thereto and conforming generally to the angularity of the plate.

8. A blast chute for deflecting the high velocity high temperature jet issuing from the nozzle of an aircraft jet engine comprising a frame adapted to be positioned behind the nozzle, an upwardly facing channel plate on top of the frame having an open forward end to receive the jet from the nozzle and extending upwardly and rearwardly from its forward end to the rear end of the frame to direct the jet upwardly, the channel plate comprising a bottom wall and side walls extending upwardly from the margins thereof, and a liner for the channel plate spaced above the bottom wall thereof to leave a cooling air space that is open at said side walls for the reception of air, the cover plate and liner sloping upwardly and rearwardly from the front end of the frame at a small angle to the horizontal to about midway between the ends of the frame and then sloping upwardly and rearwardly to the rear end of the frame at a substantially greater angle to the horizontal.

9. A blast chute for deflecting the high velocity high temperature jet issuing from the nozzle of an aircraft jet engine comprising a frame adapted to be positioned behind the nozzle, an upwardly facing channel plate on top of the frame having an open forward end to receive the jet from the nozzle and extending upwardly and rearwardly from its forward end to the rear end of the frame to direct the jet upwardly, the channel plate comprising a bottom wall and side walls extending upwardly from the margins thereof, a liner overlying the plate in spaced relation thereto to leave a cooling air space, the liner substantially conforming in shape to the plate and having a bottom wall and side walls extending upwardly from the margins thereof, the side walls of the liner being spaced from the side walls of the plate to admit atmospheric air to said cooling air space.

10. A blast chute for deflecting the high velocity high temperature jet issuing from the nozzle of an aircraft jet engine comprising a frame adapted to be positioned behind the nozzle, an upwardly facing channel plate on top of the frame having an open forward end to receive the jet from the nozzle and extending upwardly and rearwardly from its forward end to the rear end of the frame to direct the jet upwardly, the channel plate comprising a bottom wall and side walls extending upwardly from the margins thereof, a liner overlying the plate in spaced relation thereto to leave a cooling air space, the liner substantially conforming in shape to the plate and having a bottom wall and side walls extending upwardly from the margins thereof, said bottom walls of the plate and liner increasing rearwardly in width and said side walls of the plate and liner sloping upwardly and laterally from said margins.

11. A device for deflecting the high temperature high velocity jet issuing from the nozzle of a jet engine comprising a frame adapted to be positioned behind said nozzle to have its forward end adjacent and in line with the nozzle, a plate on top of the frame having a bottom wall sloping upwardly and rearwardly from the forward end of the frame to its rear end and having side walls sloping upwardly and laterally from the longitudinal margins of the bottom wall, a liner overlying the plate and having a bottom wall and side walls substantially parallel with the bottom and side walls respectively of the plate, means for spacing the liner above the plate to leave cooling air spaces therebetween, means for attaching the forward end of the liner rigidly, and means for restraining the remainder of the liner for limited movement upwardly and longitudinally relative to the plate.

12. A device for deflecting the high temperature high velocity jet issuing from the nozzle of a jet engine comprising a frame adapted to be positioned behind said nozzle to have its forward end adjacent and in line with the nozzle, a plate on top of the frame having a bottom wall sloping upwardly and rearwardly from the forward end of the frame to its rear end and having side walls sloping upwardly and laterally from the longitudinal margins of the bottom wall, a liner overlying the plate and having a bottom wall and side walls substantially parallel with the bottom and side walls respectively of the plate, said bottom walls sloping rearwardly from their forward ends to substantially midway between their ends at a much steeper angle, means for spacing the liner above the plate to leave cooling air spaces therebetween, means for attaching the forward end of the liner rigidly, and means for restraining the remainder of the liner for limited movement upwardly and longitudinally relative to the plate.

13. A device for deflecting the high temperature high velocity jet issuing from the nozzle of a jet engine comprising a frame adapted to be positioned behind said nozzle to have its forward end adjacent and in line with the nozzle, a plate on top of the frame having a bottom wall sloping upwardly and rearwardly from the forward end of the frame to its rear end and having side walls sloping upwardly and laterally from the longitudinal margins of the bottom wall, a liner overlying the plate and having a bottom wall and side walls substantially parallel with the bottom and side walls respectively of the plate, said bottom walls sloping rearwardly from their forward ends to substantially midway between their ends at a small angle to the horizontal and then sloping rearwardly to their rear ends at a much steeper angle, said bottom walls increasing in width rearwardly from their forward ends to their rear ends, means for spacing the liner above the plate to leave cooling air spaces therebetween, means for attaching the forward end of the liner rigidly, and means for restraining the remainder of the liner for limited movement upwardly and longitudinally relative to the plate.

References Cited in the file of this patent

UNITED STATES PATENTS

| Number | Name | Date |
|---|---|---|
| 1,925,139 | Fellers | Sept. 5, 1933 |
| 2,504,991 | Letvin | Apr. 25, 1950 |
| 2,585,082 | Bollinger | Feb. 12, 1952 |
| 2,608,363 | Shumaker | Aug. 26, 1952 |